UNITED STATES PATENT OFFICE.

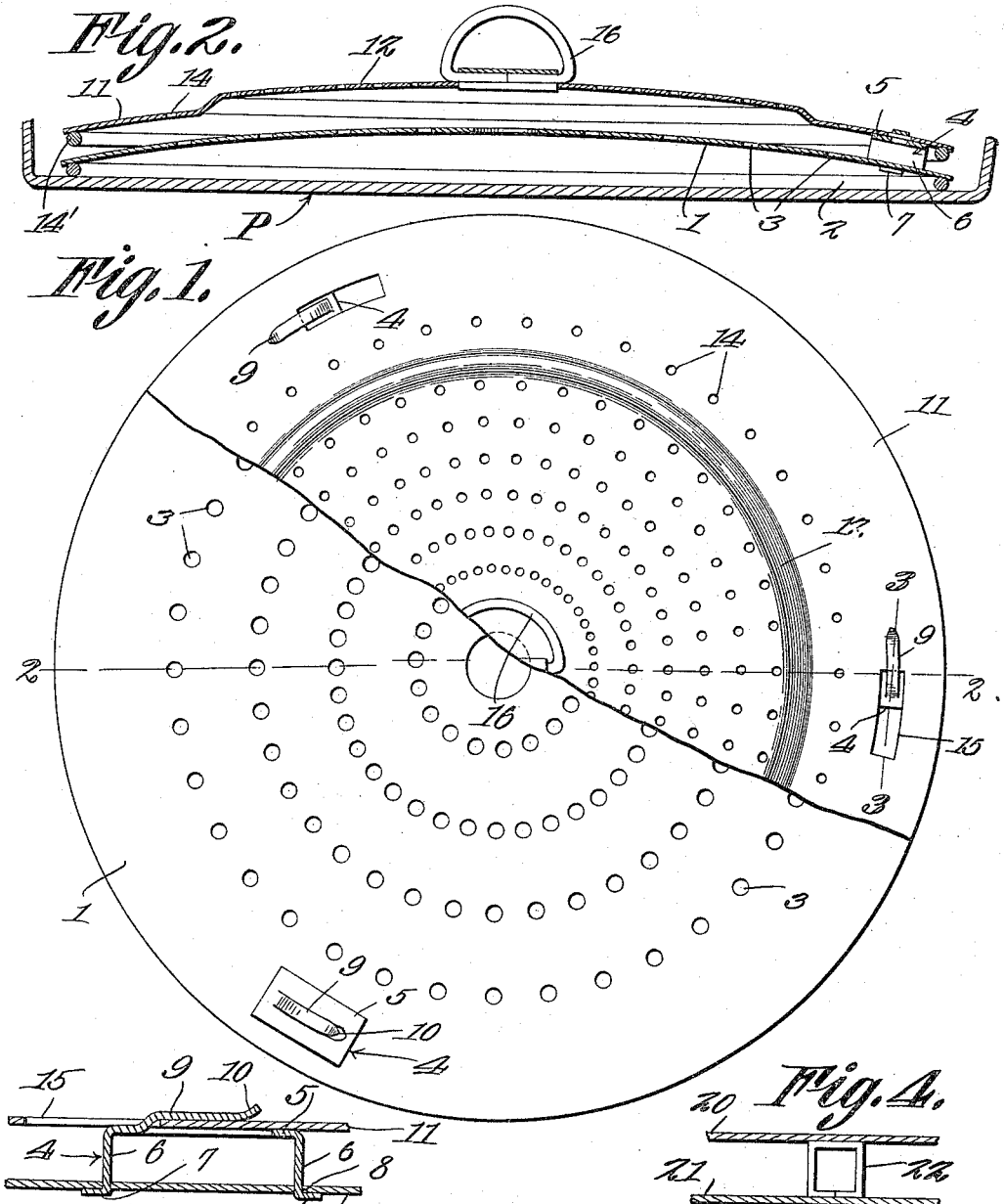

SAMUEL PETERSON AND LOUIS C. KNACKSTEDT, OF ANNAPOLIS, MARYLAND.

COOKER.

1,228,816. Specification of Letters Patent. Patented June 5, 1917.

Application filed February 29, 1916. Serial No. 81,186.

*To all whom it may concern:*

Be it known that we, SAMUEL PETERSON and LOUIS C. KNACKSTEDT, citizens of the United States, residing at Annapolis, in the county of Anne Arundel, State of Maryland, have invented a new and useful Cooker, of which the following is a specification.

The device forming the subject matter of this application is a false bottom for a cooking utensil.

The invention aims to provide novel means whereby steam may be generated in the bottom of the vessel and to provide novel means whereby the steam in a plurality of jets will pass upwardly about and through the contents of the vessel.

Another object of the invention is to provide novel means whereby steam may be generated in a vessel, before the temperature of the entire contents of the vessel has been raised to the boiling point.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows the invention in top plan, parts being broken away;

Fig. 2 is a transverse section on the line 2—2 of Fig. 1;

Fig. 3 is a fragmental section on the line 3—3 of Fig. 1;

Fig. 4 is a fragmental section showing a modified form of the invention.

The device forming the subject matter of this application preferably is fashioned from metal throughout and comprises an upwardly bulged, lower, concavo-convex disk 1. The disk 1 may be stiffened about its periphery by means of a reinforcing ring 2, although the ring 2 may be omitted if desired. In the disk 1, a plurality of perforations 3 are formed. Mounted on the disk 1 are U-shaped brackets 4 each embodying a top 5, depending arms 6 and laterally extended tongues 7 on the lower ends of the arms 6. The lower ends of the arms 6 rest on the disk 1, the tongues 7 passing through openings 8 in the disk 1 and being bent to engage the lower face of the said disk, the brackets 4 in this manner being held on the disk 1.

From the tops 5 of the brackets 4, tongues 9 are struck, the tongues 9 being bent at their free ends to form guiding projections 10. The tongues 9, as a whole, lie substantially parallel to the tops 5 of the brackets 4 and are resilient.

The invention further includes an upper disk 11 which is of concavo-convex form and is upwardly bulged, the central portion of the disk 11 being elevated slightly, if desired, as indicated at 12. The disk 11 may be reinforced peripherally by a ring 14' although the ring may be omitted if desired. In the disk 11 are formed a plurality of perforations 14, the perforations 14 being slightly smaller than the perforations 3 in the lower disk 1. The upper disk 11 is supplied with openings 15, through which the tongues 9 are adapted to pass and, when relative rotation between the disks 11 and 1 is produced, the tongues 9 engage with the disk 11 and bind the same on the tops 5 of the brackets 6 in a manner which will be obvious from Fig. 3. The disk 11 may be provided with a handle 16 of any desired form, whereby both disks may be lifted out of a pot or be placed therein.

In Fig. 4 of the drawings, a modified form of the invention has been shown. In Fig. 4, the numeral 20 designates the upper disk, the numeral 21 denoting the lower disk, and the numeral 22 indicating a bracket or spacer to which both disks 20 and 21 are permanently secured. In this form of the invention, the disks 20 and 21 are not separable like the disks 11 and 1. The construction hereinbefore described and shown in Fig. 1 of the drawings is preferable since, when the disks are separable, the structure may be cleaned out readily.

In practical operation, the false bottom hereinbefore described may be placed in the bottom of a cooking pot P. The water in the pot below the disk 1 is boiled and boiling takes place, to some extent, between the disks 1 and 11. The steam generated below the disk 1 passes through the perforations 3 of the disk 1 and through the smaller perforations 14 in the disk 11, the steam thus being projected upwardly in a plurality of jets, into the contents of the pot. The steam, rising through the water in the pot P, will cause the contents to be thoroughly agitated. Owing to the fact that the water is confined more or less below the disks 11 and 1 steam will be produced in the pot, even though the water adjacent the top of the pot be heated to no higher a temperature than one-hundred and ninety-eight degrees Fahrenheit.

Owing to the fact that the holes 14 in the upper disk 11 are smaller than the holes 3 in the lower disk 1 the steam will be projected upwardly with increased speed. The device forming the subject matter of this application will prevent meat and other articles which are being boiled from burning onto the pot or other vessel. Owing to the relative small amount of water which comes at one time into contact with the bottom of the pot, steam will be produced with a relatively small expenditure of fuel, and the steam thus created will be forced in the form of jets, upwardly into the contents of the pot. As hereinbefore stated, the disks 1 and 11 may be separated readily, thus keeping the structure in a clean and sanitary condition.

Having thus described the invention, what is claimed is:—

1. A removable false bottom for a cooking utensil, comprising superposed upwardly bulged concavo-convex disks having perforations; and connections uniting the disks, the connections being spaced from each other circumferentially of the disks, to leave the space between the disks open at the peripheries of the disks throughout practically the entire circumference of the disks.

2. A removable false bottom for a cooking utensil, comprising superposed disks; and brackets secured to the lower disk, the upper disk being provided with openings, and the tops of the brackets being provided with tongues extended circumferentially of the disks and disposed approximately parallel to the disks, the openings being adapted to receive the tongues, upon relative rotation between the disks, thereby to hold the disks releasably interlocked.

In testimony that we claim the foregoing as our own, we have hereto affixed our signatures in the presence of two witnesses.

SAMUEL PETERSON.
LOUIS C. KNACKSTEDT.

Witnesses:
R. GARDINER CHANEY, Jr.,
MARTIN T. JACKSON.

Copies of this patent may be obtained for five cents each, by addressing the "Commissioner of Patents, Washington, D. C."